L. H. FLANDERS.
SECONDARY BATTERY.
APPLICATION FILED APR. 15, 1905.
909,572.
Patented Jan. 12, 1909.
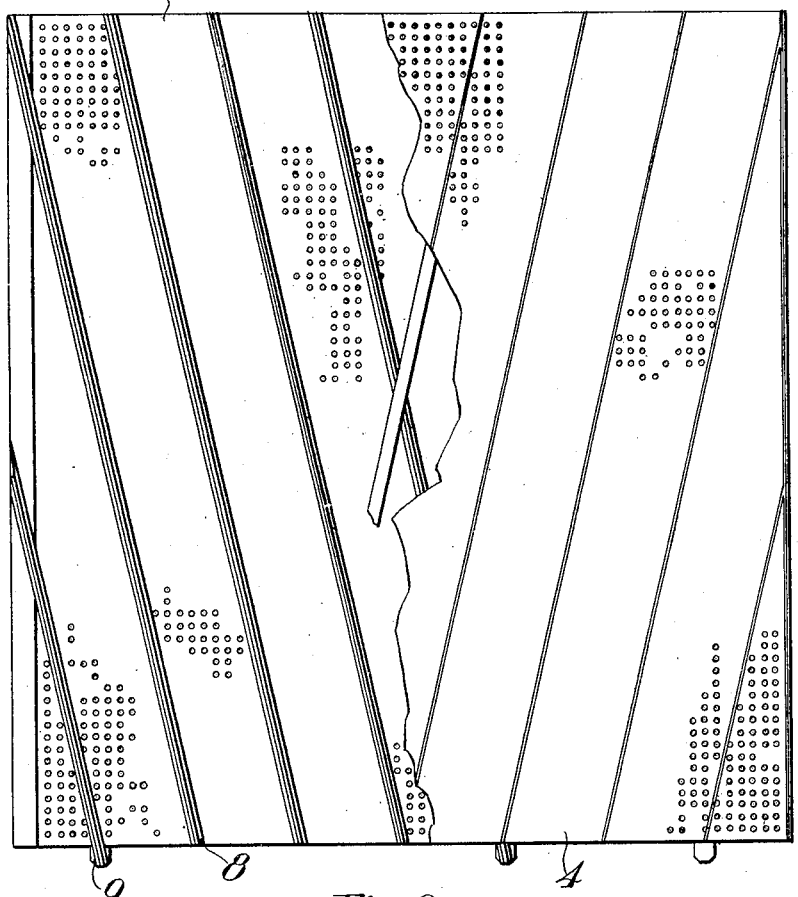
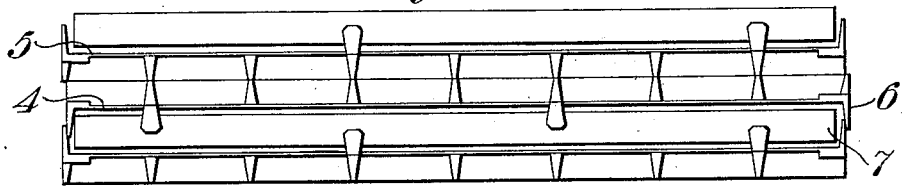
WITNESSES:
G. L. Ryder
E. W. McCallister
INVENTOR
Louis H. Flanders
BY Jno. S. Green
ATTORNEY

UNITED STATES PATENT OFFICE.

LOUIS H. FLANDERS, OF WILKINSBURG, PENNSYLVANIA, ASSIGNOR TO THE WESTINGHOUSE MACHINE COMPANY, A CORPORATION OF PENNSYLVANIA.

SECONDARY BATTERY.

No. 909,572.      Specification of Letters Patent.      Patented Jan. 12, 1909.

Application filed April 15, 1905. Serial No. 255,745.

*To all whom it may concern:*

Be it known that I, LOUIS H. FLANDERS, a citizen of the United States, and a resident of Wilkinsburg, in the county of Allegheny and State of Pennsylvania, have invented a new and useful Improvement in Secondary Batteries, of which the following is a specification.

This invention relate to secondary batteries and more particularly to separators for the electrodes of such batteries.

In secondary batteries it is necessary to keep the plates or electrodes from coming in contact with each other, and this is usually accomplished by placing an element composed of insulating material between them.

In secondary batteries designed to occupy a minimum amount of space, considerable difficulty has been encountered by short-circuiting between the plates through a phenomenon called "bridging", which consists in the plates or electrodes becoming connected by an electrolytically deposited chain of some conducting salt or metal. This deposition generally occurs upon the surfaces of the interposed separators.

The object of this invention is to produce a separator which, while occupying a minimum amount of space, will prevent bridging of the active material.

A further object is the production of a separator which shall prevent the active material from dropping off the plates or wasting away, and one that is capable of adapting itself to the changes that may occur in the electrodes, due to expansion and contraction during the operation of charging or discharging the batteries.

These and other objects I attain in a separator embodying the features herein described and illustrated.

In the drawings accompanying this application and forming a part thereof, Figure 1 is a partial view of adjacent parts of separators, the near portion being broken away, showing a partial view of the far portion. Fig. 2 is an end view of separators in connection with electrodes.

The separator consists of two perforated sheets 4 and 5 of insulating material, which, with their lateral flange-strips 6, form an inclosing sheath for the electrode 7. The flange-strips 6 are arranged to interlock, forming an expansible joint and as the sheath is open at the top and bottom, the inclosing sheath is capable of adapting itself to the contour of the electrode. Each of the perforated sheets 4 and 5 is provided with obliquely extending ribs 8 which reinforce the sheet and perform the function of spacing strips in separating the adjacent plates of the separator. The inclined spacing strips of a portion of the separator on one plate intersect the oppositely inclined spacing strips of a portion of the separator on an adjacent plate, as shown in Fig. 1. Under these conditions the tendency of active material to bridge between adjacent plates is substantially overcome as no continuous surface is presented over which the phenomenon could take place, since the portion of the separator in contact with one plate is not in contact with the adjacent plate and since the intersecting ribs are inclined, the active material lodging on them will slide down and drop off of the separator into the bottom of the containing vessel.

The interlocking lateral flange-strips 6 prevent short-circuiting due to depositions of active material at the ends of the containing jar and a consequent bridging between the edges of the plates.

Mounted at the bottom of the perforated sheets on the ends of conveniently located spacing ribs are anchoring lugs 9 which prevent the separator from rising, due to its tendency to float in the electrolyte.

The hooks or lugs 9 are placed under the electrodes or plates and are of sufficient length to admit of considerable play or motion between the plates without releasing the separator. Since the inclosing sheath for each electrode is composed of separate halves, it will fit more securely to the surface of the electrode and the construction of the sheath is such that while it rigidly prevents contact of adjacent plates, the separate halves are pliable and capable, to some extent, of assuming the shape of the surface of the electrode. This allows the perforated sheets 4 and 5 to come into intimate contact with the active material of the electrode and form, with the plates, upon which the material is deposited, an inclosing casing. The tendency of the active material, therefore, to drop off or waste away is overcome.

The separator is made of some insulating material, such as hard rubber, and by vulcanizing or other means the perforated sheet, the lateral flange-strips, the separating ribs and the anchoring lugs are joined together. The separate halves of the separators are not connected but are adapted to adjust themselves to the conditions encountered, as before stated.

The cell may be so arranged that alternate electrodes only are inclosed by a sheath. Under such conditions the separator ribs of the sheath will come in direct contact with the adjacent plate or if desired, an additional perforated sheet may be interposed between the ribs and the plate. With this arrangement, as in the case where each plate is inclosed by a sheath, the tendency of the plates to distort or buckle is substantially overcome, as each plate is inclosed between oppositely inclined sets of rigid separator ribs and a tendency of the ribs to distort, unresisted by one set of ribs, will be overcome by the set on the opposite side of the plate.

Since the spacing ribs are inclined the tendency towards bridging between adjacent plates, even when alternate plates only are inclosed by the sheath, is overcome, as any solid material lodging on the rib will slide down and drop off the separator into the bottom of the jar, as before described.

The plates or electrodes, by being separated by the rigid spacing ribs of the interposed separator, act upon each other and prevent individual motion and a consequent breaking of their supporting lugs or hooks. In cells which are subjected to vibrations and jars, this feature of the separator is necessary.

Having now described my invention, what I claim as new and useful and desire to secure by Letters Patent is:—

1. In combination with an electrode, a separator comprising a perforated sheet adapted to lie in contact with a lateral face of said electrode and provided with a plurality of integrally formed and obliquely extending spacing strips.

2. In combination with an electrode, a separator comprising an inclosing casing for the electrode composed of perforated sheets provided with obliquely extending spacing strips formed integrally with and exteriorly mounted thereon.

3. In combination with an electrode, a separator, consisting of a perforated flanged member provided with rigidly mounted and obliquely extending spacing strips and retaining lugs connected to the bottom portion of said flanged member for securing it in place on said electrode.

4. In combination with an electrode, a separator comprising two perforated sheets each adapted to contact with a lateral face of the electrode, lateral flanges formed integrally with said sheet and adapted to inclose the vertical edges of the electrode, and obliquely extending spacing ribs formed integrally with each sheet and mounted exteriorly thereon.

5. In combination with an electrode, a separator comprising a perforated flanged member, rigidly mounted spacing strips located on one face of said member, and retaining lugs secured to the bottom portion of said member and adapted to secure it in place on said electrode.

6. In combination with an electrode, a separator comprising a perforated member provided with retaining lugs located at the bottom portion of said member and adapted to secure it in place on said electrode.

7. In combination with an electrode, a separator consisting of a perforated flanged member provided with retaining lugs secured to the bottom of said member and adapted to secure said member in place on said electrode.

8. In combination with an electrode, a separator comprising a perforated sheet adapted to lie in contact with a lateral face of the electrode, a plurality of obliquely extending spacing strips secured to said sheet, and means secured to the bottom of said sheet and adapted to secure it in place on the electrode.

In testimony whereof, I have hereunto subscribed my name this 14th day of April, 1905.

L. H. FLANDERS.

Witnesses:
DAVID WILLIAMS,
JNO. S. GREEN.